United States Patent
Fazio et al.

(10) Patent No.: US 6,852,169 B2
(45) Date of Patent: Feb. 8, 2005

(54) APPARATUS AND METHODS FOR PROCESSING OPTICAL FIBERS WITH A PLASMA

(75) Inventors: James P. Fazio, Concord, CA (US); James D. Getty, Vacaville, CA (US); Leslie D. Wood, Antioch, CA (US)

(73) Assignee: Nordson Corporation, Westlake, OH (US)

( * ) Notice: Subject to any disclaimer, the term of this patent is extended or adjusted under 35 U.S.C. 154(b) by 15 days.

(21) Appl. No.: 10/145,518

(22) Filed: May 14, 2002

(65) Prior Publication Data

US 2002/0170877 A1 Nov. 21, 2002

Related U.S. Application Data

(60) Provisional application No. 60/291,472, filed on May 16, 2001.

(51) Int. Cl.[7] .......................... C23C 16/00; C23C 14/00; B65G 49/07
(52) U.S. Cl. ............ 118/718; 156/345.31; 156/345.32; 118/719; 414/939; 204/298.24
(58) Field of Search ...................... 118/718; 204/298.24

(56) References Cited

U.S. PATENT DOCUMENTS

| | | | |
|---|---|---|---|
| 4,046,298 A | 9/1977 | Schroeder, Jr. | 225/2 |
| 4,312,571 A | 1/1982 | Ganzhorn | 350/320 |
| 4,432,807 A | 2/1984 | Shirasaka et al. | 134/2 |
| 4,434,554 A | 3/1984 | Korbelak | 30/90.8 |
| 5,298,105 A | 3/1994 | Dorsey | 156/584 |
| 5,359,690 A | 10/1994 | Kaizu et al. | 385/134 |
| 5,439,736 A * | 8/1995 | Nomura | 428/308.4 |
| 5,460,683 A | 10/1995 | Beasley, Jr. et al. | 156/344 |
| 5,600,750 A | 2/1997 | Beasley, Jr. et al. | 385/114 |
| 5,795,428 A | 8/1998 | Beasley, Jr. et al. | 156/344 |
| 5,946,986 A | 9/1999 | Dodge et al. | 81/9.51 |
| 5,988,556 A * | 11/1999 | Bednarczyk et al. | 242/476.2 |
| 6,023,996 A | 2/2000 | Dodge et al. | 81/9.51 |
| 6,044,792 A * | 4/2000 | Ogawa et al. | 118/723 E |
| 6,127,003 A * | 10/2000 | Fukuda et al. | 427/535 |
| 6,478,876 B1 * | 11/2002 | Asamoto | 118/726 |
| 6,488,777 B2 * | 12/2002 | Madan et al. | 118/718 |
| 6,547,920 B2 * | 4/2003 | Gatica et al. | 156/345.2 |
| 6,671,450 B2 * | 12/2003 | Khan et al. | 385/137 |

FOREIGN PATENT DOCUMENTS

| | | | |
|---|---|---|---|
| EP | 1065181 | 1/2001 | C03C/25/10 |
| GB | 2097551 | 11/1982 | G02B/5/14 |
| WO | WO 01/77714 | 10/2001 | |

OTHER PUBLICATIONS

Glenn Ogura, *Laser Stripping of Optical Fibers Opens Up New Applications*, Laser Focus World, Jun. 2001, p. 169 (6 pages).

* cited by examiner

Primary Examiner—Parviz Hassanzadeh
Assistant Examiner—Karla Moore
(74) Attorney, Agent, or Firm—Wood, Herron & Evans, L.L.P.

(57) ABSTRACT

Plasma processing system and methods for stripping the buffer and, optionally, removing the cladding from an optical fiber. The plasma processing system includes a holder capable of holding one or more optical fibers such that a mid-span portion of each optical fiber is exposed to a plasma generated within a processing chamber of the system and the ends of each optical fiber are unaffected by the plasma treatment. Tapered transition zones are created between the plasma-treated portion of the optical fiber and the shielded ends. Treatment may be accomplished using a plasma containing atomic and molecular radicals and ions of fluorine and oxygen.

39 Claims, 7 Drawing Sheets

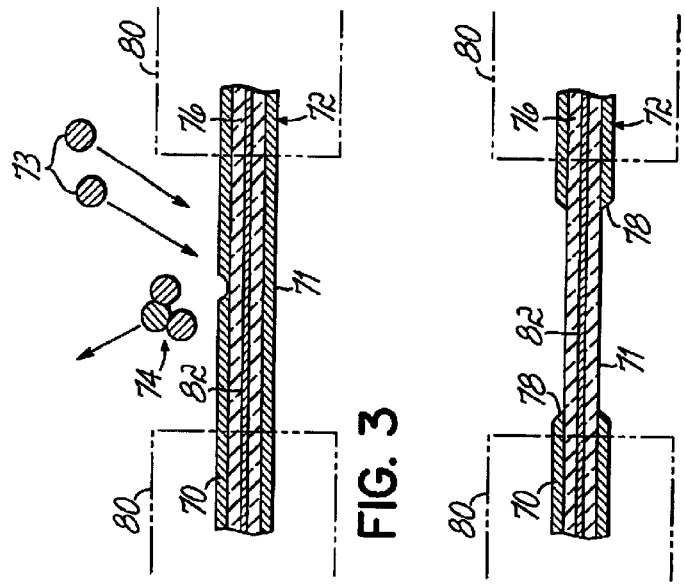
FIG. 3
FIG. 3A
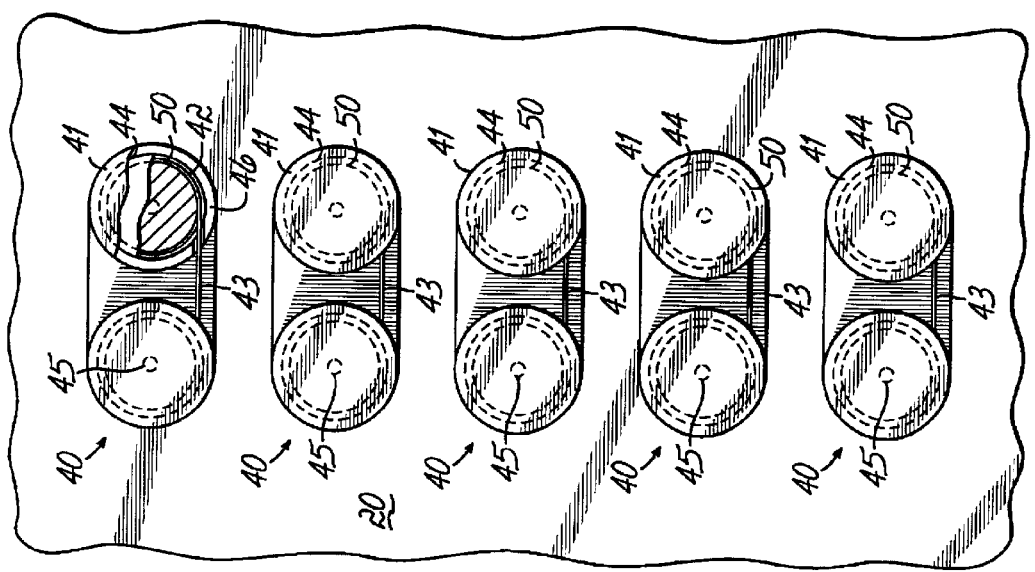
FIG. 2

APPARATUS AND METHODS FOR PROCESSING OPTICAL FIBERS WITH A PLASMA

CROSS-REFERENCE TO RELATED APPLICATIONS

This application claims the benefit of U.S. Provisional Application No. 60/291,472 filed on May 16, 2001, the disclosure of which is hereby incorporated by reference herein in its entirety.

FIELD OF THE INVENTION

The present invention relates to plasma processing and, in particular, to the processing of optical fibers with a plasma.

BACKGROUND OF THE INVENTION

Modern telecommunications systems rely on fiber optic cables for transferring optical data signals over significant distances with low loss and minimal attenuation. Conventional fiber optic cables include one or more optical fibers surrounded radially by a protective buffer, a strengthening layer, and an outer sheath or jacket. Each optical fiber consists of a cylindrical core covered by an annular cladding. The core is the light carrying element or waveguide of the optical fiber that transports the optical data signals as light pulses from a light source to a receiving device. The core typically comprises a strand of a high-purity silica glass doped to provide a relatively high index of refraction. The cladding likewise consists of high-purity silica having a relatively low index of refraction, which promotes total internal reflection of light at the cylindrical interface with the core. The buffer, formed of an acrylate, a polyamide or a like polymer, is a protective layer that encases the cladding. Surrounding the buffer is an annular layer of strengthening material, which prevents elongation when a tensile force is applied to the fiber optic cable. The outer jacket protects the inner layers against abrasion and the infiltration of solvents and other contaminants.

Stripped optical fibers are used in various applications including hermetic sealing, pigtailing laser diodes, fiber arrays, fiber Bragg gratings, and amplifier seeding. Fiber Bragg gratings, for example, are widely used in the fabrication of various functional devices for wavelength division multiplexing (WDM) and dense wavelength division multiplexing (DWDM). A fiber Bragg grating is created inside the core, for example, using ultraviolet radiation to inscribe, write or project the lines of the grating. Before forming the fiber Bragg grating, all coatings must be stripped from the fiber optic cable so that the outer surface of the cladding or core is exposed over a length on the order of a few centimeters. New generations of devices will scale the length of the stripped region downward to sub-centimeter proportions and, eventually, to sub-millimeter proportions.

Although the outer jacket and strengthening layer are relatively simple to excise from the buffer, the buffer cannot be easily removed from the cladding. Mechanical stripping, chemical stripping, thermo-mechanical stripping and laser stripping are among the conventional methods used to remove the buffer from the cladding of the optical fiber and are individually described below. These conventional buffer removal methods are generally not effective and, at the least, are not efficient for stripping the cladding from the outer surface of the core after the buffer is removed.

Various deficiencies of mechanical stripping limit its usefulness for stripping optical fibers. Mechanical stripping is a manual procedure that restricts productivity because the optical fibers must be processed individually, not in batches. Mechanical stripping cannot taper the cladding thickness at the peripheries of the stripped region or transition zones. Moreover, mechanical stripping from latent defect and reliability issues in that the glass of the optical fiber may be scratched or nicked, which reduces fiber strength and splice strength. Because mechanical stripping is performed manually, the stripping is not reproducible between optical fibers in a single batch and among various batches of optical fibers. In addition, mechanical stripping is best suited for end stripping and is not effective for mid-span stripping.

Chemical stripping removes the buffer using an aggressive etchant such as hot sulfuric acid. The fiber optic cable is bent into a loop and dipped into the etchant. Chemical stripping fails in many regards in its ability to strip the buffer from optical fibers effectively and efficiently. First, the stripped length of the buffer cannot be precisely controlled during the etching process. Second, the minimum bend radius, about 15 millimeters, of the optical fiber controls the minimum length of the buffer than can be removed by immersion in an etchant bath. Third, the thickness of the buffer cannot be tapered at the transition zones of the stripped span. Fourth, the etchant may wick between the buffer and cladding at the peripheries. As a result, the optical fiber itself may be attacked by the residual etchant after the buffer is removed from the etchant bath, which results in a reduced tensile strength. Finally, the end point of the wet chemical process may be difficult to detect because the optical fiber is immersed in the etchant bath.

Thermo-mechanical stripping heats the fiber optic cable to soften the buffer and uses a blade to scrape the buffer from the exterior of the cladding. However, stripping fiber optical cables thermomechanically has several significant drawbacks. Although mid-span stripping is possible, thermo-mechanical stripping cannot taper portions of the buffer in the transition zones and may actually damage those portions. Moreover, polyamide buffers are especially difficult to remove by thermo-mechanical stripping. Finally, the manual process used to perform thermo-mechanical stripping lacks reproducibility.

Finally, laser stripping uses an ultraviolet laser to strip the buffer from the optical fiber. A primary deficiency of laser stripping is that the transition zones of the buffer are not tapered for mid-span stripping. Moreover, laser stripping is a relatively slow process that makes large-scale optical fiber stripping operations both time consuming and commercially impractical.

To remedy these deficiencies of conventional stripping, the present invention provides an apparatus and method for efficiently and effectively removing the buffer and, optionally, the cladding from a fiber optic cable.

SUMMARY OF THE INVENTION

According to the present invention, apparatus and methods are provided for treating an optical fiber in a plasma processing system to remove the cladding from a mid-span portion or segment of the fiber. An apparatus for use in treating an optical fiber with a plasma includes a first outer housing and a second outer housing spaced apart from the first outer housing. The apparatus further includes a first spool positioned within the first outer housing and a second spool positioned within the second outer housing. The first spool is capable of receiving a first end of an optical fiber and the second spool is capable of receiving a second end of the optical fiber so that a mid-span portion of the optical fiber extends between the first and second outer housings. The mid-span portion of the optical fiber is exposed to a plasma in a processing chamber for removing the buffer from the cladding and, optionally, to remove the cladding from the core.

In certain embodiments of the invention, the apparatus may include a plurality of first spools positioned within the first outer housing and a plurality of second spools positioned within the second outer housing, which cooperate to hold multiple optical fibers so that a mid-span portion of each optical fiber is exposed to the plasma in the processing chamber and can be processed by a single plasma treatment. In other embodiments, the separation between the first and second outer housings is adjustable for selecting the length of the mid-span portion of the optical fiber exposed to the plasma. In other embodiments, at least one of the first outer housing and the second outer housing is positioned within the processing chamber of the system. In still other embodiments, the first outer housing and the second outer housing are both positioned within the processing chamber of the system.

The apparatus may be provided as part of a plasma processing system that is configured to treat an optical fiber with a plasma and that includes a processing chamber capable of providing the plasma in a plasma treatment space in which the mid-span portion of the optical fiber is positioned.

A method of removing the buffer and, optionally, the cladding, from a mid-span portion of an optical fiber comprises placing the mid-span portion of the optical fiber in a processing chamber, generating a plasma in the processing chamber, and exposing the mid-span portion of the optical fiber to the plasma for a time sufficient to remove at least one of the buffer and the cladding from the mid-span portion of the optical fiber. In certain embodiments, the plasma contains atomic and molecular fluorine, oxyflouro- and oxygen radicals and ions. In other embodiments, the method can further include the step of removing the optical fiber from the processing chamber and repeating the steps of placing, generating and exposing, in which the step of placing further comprises placing a length of a different optical fiber in the processing chamber. In still other embodiments, the step of exposing includes tapering a first portion of the optical fiber adjacent to a first side of the mid-span portion and tapering a second portion of the optical fiber adjacent to a second side of the mid-span portion.

In other embodiments, the method further comprises generating a second plasma containing hydrogen radicals and ions in the processing chamber, after the initial step of exposing, and exposing the mid-span portion of the optical fiber to the second plasma for a time sufficient to substantially remove residual gas-phase byproducts. Removal of the residual gas-phase byproducts, such as fluorine-containing gas-phase byproducts, passivates the glass surface revealed by the plasma treatment.

The invention utilizes a plasma batch process for removing the buffer and/or cladding from multiple optical fibers. The ability to process multiple optical fibers in successive batches increases the treatment throughput and reduces the costs associated with removing the buffer and/or cladding from optical fibers. The principles of the invention also allow the buffer and/or cladding to be removed in a non-contacting manner so that latent defects reduced and the reliability is enhanced. The principles of the invention also provide reproducibility of fiber stripping among the various batches of optical fibers.

BRIEF DESCRIPTION OF THE DRAWINGS

Various advantages, objectives, and features of the invention will become more readily apparent to those of ordinary skill in the art upon review of the following detailed description of the preferred embodiments, taken in conjunction with the accompanying drawings.

FIG. 2 is a top view of the holders of the plasma processing system of FIG. 1.

FIGS. 3 and 3A are schematic representations of a plasma process for removing the cladding from an optical fiber according to the present invention.

DETAILED DESCRIPTION

Figure 1:
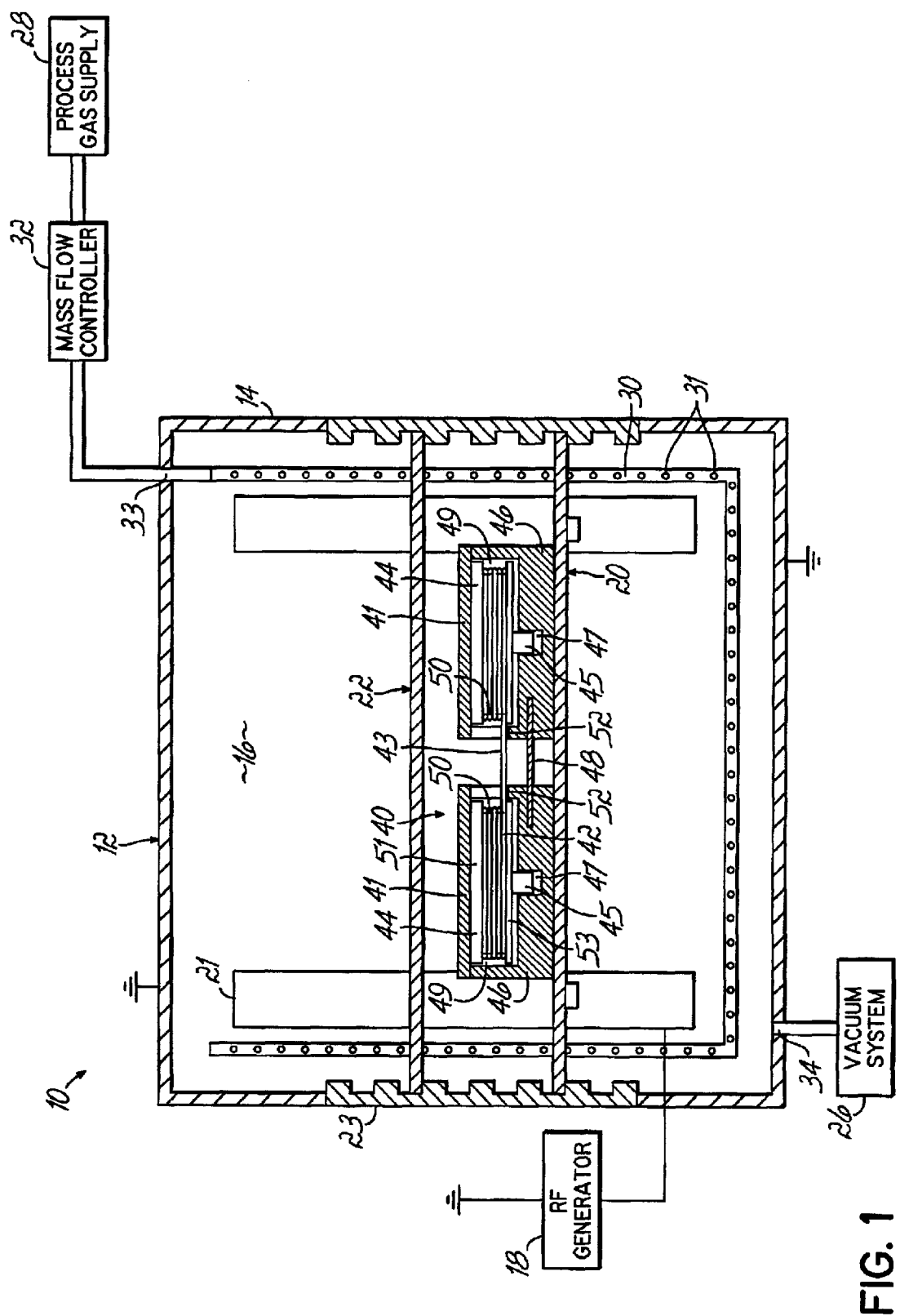
FIG. 1 is a diagrammatic, cross-sectional view of a plasma processing system for holding and treating optical fibers according to the present invention.

With reference to FIGS. 1 and 2, a plasma processing system 10 for processing one or more optical fibers to remove the buffer and, optionally, the cladding is diagrammatically presented. The plasma processing system 10 includes a processing or vacuum chamber 12, a plurality of holders 40, a vacuum system 26, and a plasma source consisting of an RF generator 18, a powered electrode 20, a ground electrode 22 supported on a ground feedthrough 23, and a process gas supply 28. The powered electrode 20 is electrically coupled via a power feedthrough 21 to the RF generator 18. The vacuum chamber 12 includes a chamber wall 14 which surrounds and encloses a vacuum processing space 16. The vertical spacing between the powered electrode 20 and the ground electrode 22 is adjustable to change the volume of the vacuum processing space 16, which defines the boundaries of a plasma treatment space, between the electrodes 20 and 22. The RF generator 18 delivers an RF power, for example, between about 300 watts and about 700 watts at a frequency ranging from about 30 kHz to about 30 MHz to the powered electrode 20. RF power is capacitively coupled with process gas and a plasma generated from the process gas between the powered electrode 20 and the ground electrode 22.

A flow of one or more process gases is provided by the process gas supply 28 to a gas inlet 33 in the chamber wall 14. The flow of process gas from the process gas supply 28 to gas inlet 33 is regulated by a mass flow controller 32, which may receive control feedback signals from a vacuum sensor or pressure gauge (not shown) monitoring the pressure within the vacuum processing space 16. The gas inlet 33 is fluidically coupled with a gas distribution tube 30 positioned within the vacuum chamber 12. Distributed along the length of the gas distribution tube 30 are multiple spaced-apart gas ports 31 that direct process gas into the vacuum processing space 16. The gas ports 31 provide a uniformly distributed flow of process gas into the vacuum processing space 16. One suitable process gas is a mixture of carbon tetrafluoride ($CF_4$) and oxygen ($O_2$) supplied to vacuum chamber 12 at a flow rate between about 200 standard cubic centimeters per minute (sccm) to about 800 sccm.

With continued reference to FIGS. 1 and 2, the vacuum system 26 is fluidically coupled with the vacuum processing space 16 through a vacuum port 34. The vacuum system 26 may be any vacuum system suitable for evacuating vacuum processing space 16 to provide a base vacuum in the range of at least about 1 mTorr to about 10 mTorr. A typical vacuum system 26 suitable for evacuating the vacuum processing space has a maximum pumping rate of between about 11 cubic feet per minute (cfm) and about 90 cfm. The pumping rate, as well as the flow rate of process gas(es), are regulated to provide a suitable operating pressure of process gas in the vacuum processing space 16, which is typically between about 250 mTorr and about 500 mTorr, typically about 400 mTorr. The process gas in the vacuum processing space 16 is excited by RF power from the RF generator 18 to initiate and sustain a plasma in the portion of the vacuum processing space 16 between electrodes 20 and 22.

According to principles of the present invention and with continued reference to FIGS. 1 and 2, a plurality of, for example, five holders 40 are positioned in a spaced-apart fashion within vacuum chamber 12. Each holder 40 is utilized to hold an optical fiber 42, after removal of the outer jacket and strengthening layer by a conventional method, for plasma treatment in the plasma processing system 10. As used herein, an optical fiber 42 may consist of a core, a core covered by a cladding, or a core and a cladding covered by a buffer. The number of holders 40 is limited by the space available within the vacuum chamber 12 so that a plurality of optical fibers 42 may be plasma treated by a batch treatment operation in system 10.

With continued reference to FIGS. 1 and 2, the holders 40 are positioned with a transversely spaced-apart relationship on the powered electrode 20. Each holder 40 holds one of the optical fibers 42 with a mid-span portion 43 suspended transversely in the portion of the vacuum processing space 16 between the electrodes 20 and 22 of the vacuum chamber 12. It is understood by persons of ordinary skill in the art that the RF power may be provided to electrode 22 and the holders 40 may be positioned on the electrode 22, which would be unpowered or grounded. The mid-span portion 43 of optical fiber 42 is immersed in, or exposed to, the plasma when the plasma is present within the vacuum processing space 16. The entire circumferential surface area of the mid-span portion 43 of optical fiber 42 is positioned for substantially uniform exposure to the various atomic species, including radicals, ions, neutrals and molecules, present in the plasma. Typically, the plasma has characteristics, as will be described below, sufficient to remove or etch the buffer and, optionally, the cladding from the mid-span portion 43 of fiber 42.

Each holder 40 includes a pair of identical outer housings 46 each having an interior space 49, a pair of identical spools 44 each removably mountable within the interior space 49 of one of the outer housings 46, and a pair of identical top plates 41. Each top plate 41 is fastened by conventional fasteners or adhesively bonded to one end of one of the spools 44. When each of the spools 44 is installed in one of the outer housings 46, the interior space 49 of each outer housing 46 is substantially enclosed and isolated from a plasma generated in the vacuum processing space 16. It follows that ends of optical fiber 42 inside the interior space 49 will likewise be isolated or shielded from the plasma in vacuum processing space 16.

With continued reference to FIGS. 1 and 2, each spool 44 has a winding portion 50, preferably cylindrical, about which a respective length of the optical fiber 42 may be wound and a pair of circumferential flanges 51 and 53. Opposite ends of the optical fiber 42 are wound about the winding portion 50 of each of a pair of the spools 44. To that end, each spool 44 further includes a cylindrical spindle 45 that projects outwardly from flange 53. A recess 47 provided in the interior space 49 of outer housing 46 rotatably receives spindle 45. The circumferential flanges 51 and 53 constrain the axial position of the optical fiber 42 as it is being wound about the winding portion 50. The spools 44 and the associated wound lengths of optical fiber 42 are positioned within the respective interior spaces 49 of a pair of the outer housings 46. As the pair of spools 44 carrying the optical fiber 42 are inserted into respective ones of the pair of outer housings 46, the optical fiber 42 is received in a slot 52 provided in a side wall of each outer housing 46. When the spools 44 are positioned within the associated pair of outer housings 46, the mid-span portion 43 of optical fiber 42 extends between outer housings 46. The transverse or lateral spacing between the outer housings 46 may be adjusted by moving one housing 46 transversely relative to the other housing 46 of the registered pair. The transverse movement is constrained by a guide rod 48 extending between the pair of outer housings 46. The lateral spacing determines the length of the mid-span portion 43 of the optical fiber 42 that will be stripped by the plasma. When a plasma is present in the vacuum processing space 16, the ends of the optical fiber 42 that are inside the outer housings 46 are effectively shielded from the plasma so that the buffer and/or cladding wound about the winding portions 50 do not receive an appreciable plasma exposure.

Each outer housing 46 is formed of a metal or metal alloy, such as aluminum or an aluminum alloy, having a relatively high electrical conductivity. Each spool 44 is formed of a dielectric material having a relatively low thermal conductivity and a relatively high melting point. Such materials would include ceramics, such as aluminum oxide, and polymers, such as fluoropolymers. Suitable fluoropolymers include polytetrafluoroethylene (PFTE), fluorinated ethylene propylene (FEP), perfluoroalkoxy copolymer (PFA), and amorphous fluoropolymers (AF) collectively marketed under the trade name TEFLON® by E.I. du Pont de Nemours and Company (Wilmington, Del.). It is appreciated that the plasma in the vacuum processing space 16 generates a significant amount of heat. The reduced thermal conductivity of the spool 44 reduces the transfer of heat by conduction to the optical fiber 42. As a result, the ends of the optical fibers 42 contacting the spools 44 will remain relatively cool during the plasma treatment and will not be adversely affected by elevated temperatures. The relatively low electrical conductivity of spool 44, by virtue of its non-conducting dielectric composition, electrically isolates the optical fiber 42 from the powered electrode 20.

In use and with reference to FIGS. 1 and 2, optical fiber 42 is wound about a pair of the spools 44, which are then positioned on the powered electrode 20 within the vacuum processing space 16. The mid-span portion 43 of each optical fiber 42 is suspended transversely in the portion of the vacuum processing space 16 between the electrodes 20 and 22 of the vacuum chamber 12. The vacuum processing space 16 is evacuated using vacuum system 26 and process gas is supplied from process gas supply 28. RF generator 18 is used to generate a plasma in the vacuum processing space 16 adequate for removing the buffer and, optionally, the cladding from the mid-span portion of the optical fiber 42. The plasma in vacuum processing space 16 may be any plasma adequate for removing the buffer and, optionally, the cladding from the mid-span portion 43 and, in particular, may be generated with specific characteristics to be described below. The mid-span portion 43 of each optical fiber 42 is exposed to the plasma for a duration sufficient to remove at least the buffer. After the plasma treatment is concluded, the optical fibers 42 are removed from the vacuum chamber 16.

Figure 2A:
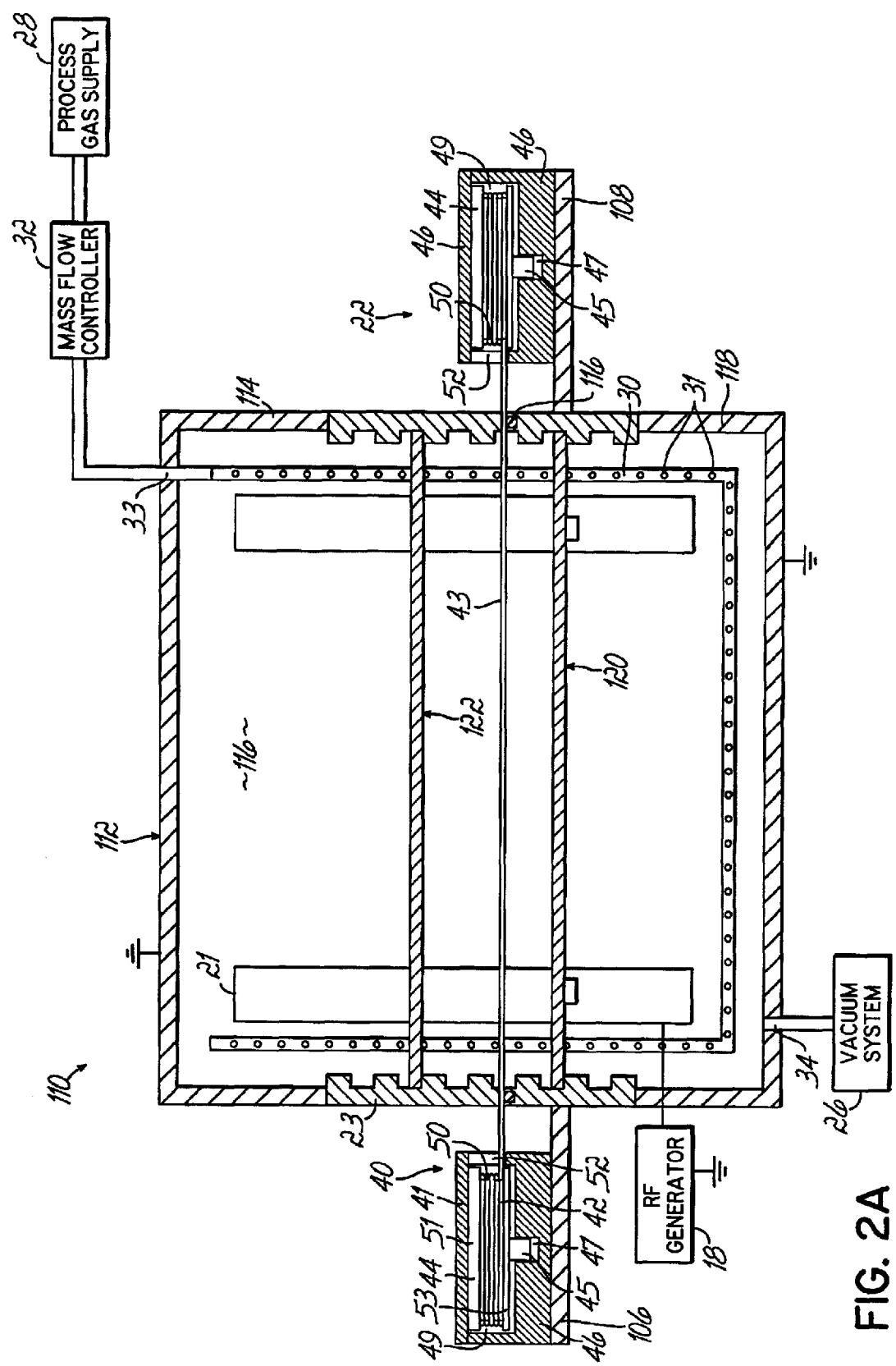
FIG. 2A is a diagrammatic, cross-sectional view of an alternative embodiment of a plasma processing system for holding and treating optical fibers according to the present invention.
Figure 2B:
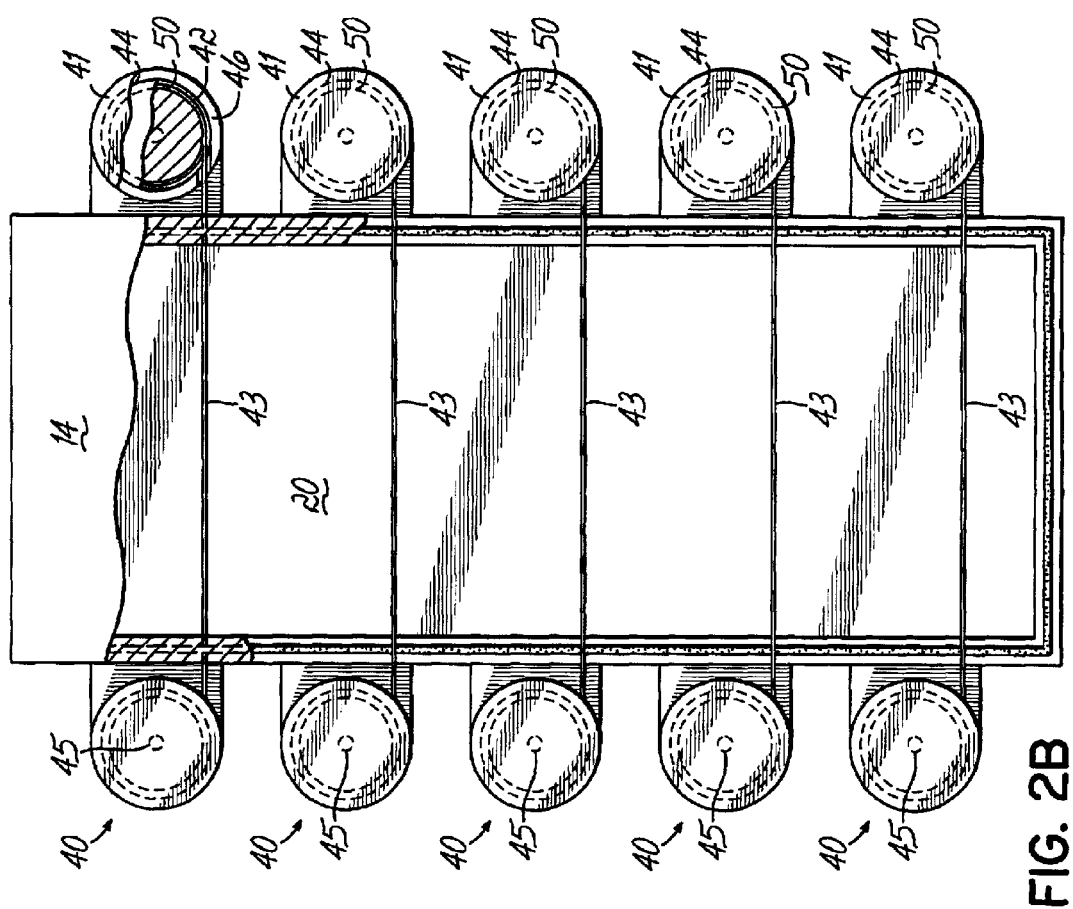
FIG. 2B is a partially broken-away, top view of the plasma processing system of FIG. 2A.

In another embodiment of the present invention and as illustrated in FIGS. 2A and 2B in which like reference numerals represent like features, the pairs of holders 40 may be positioned on shelves 106, 108 in the ambient atmosphere outside, and adjacent to, a vacuum chamber 112 of a plasma processing system 110. The vacuum chamber 112 includes a removable lid 114 sealed to a base 118 by an intervening O-ring 116 constructed from a polymer, such as VITON®. The optical fibers 42 held by the holders 40 are captured between confronting surfaces of the lid 114 and the O-ring 116 when the lid 114 has a sealing engagement with the base 118. The presence of the optical fibers 42 between the lid 114 and the O-ring 116 does not significantly degrade the vacuum environment within the vacuum chamber 112. Vacuum chamber 112 is dimensioned such that the mid-span portion 43 of each fiber is positioned within a portion of a processing space 116 between a powered electrode 120 and an unpowered electrode 122. When a suitable plasma is present in the vacuum processing space 16 and as discussed below, the buffer and, optionally, the cladding may be removed from the mid-span portion 43 of each optical fiber 42.

Figures 5, 5A:
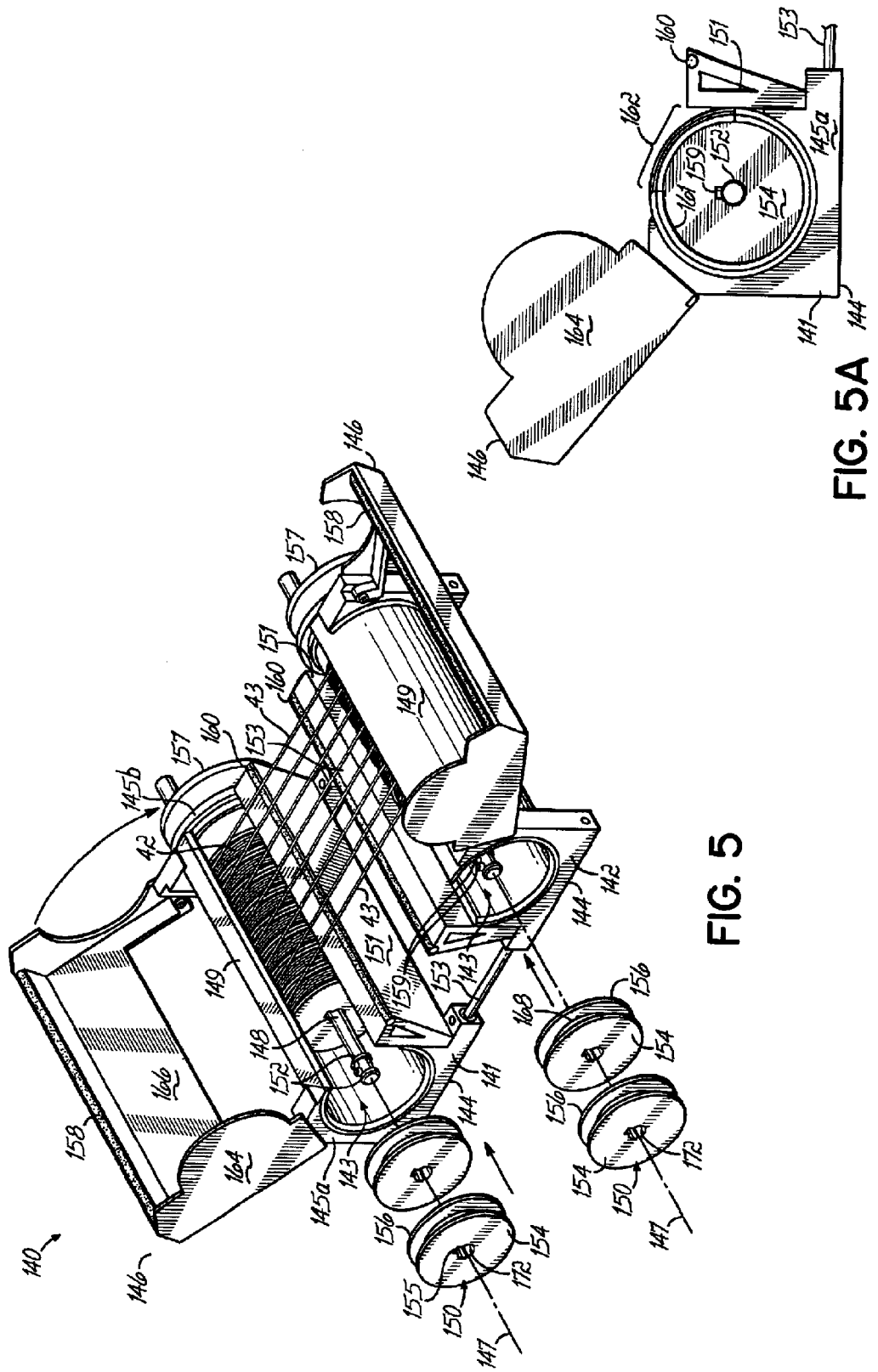
FIG. 5 is a perspective view of a holder for holding a plurality of optical fibers, shown holding multiple optical fibers and with the lid in an open position.
FIG. 5A is an end view of one of the outer housings of the holder of FIG. 5.
Figure 6:
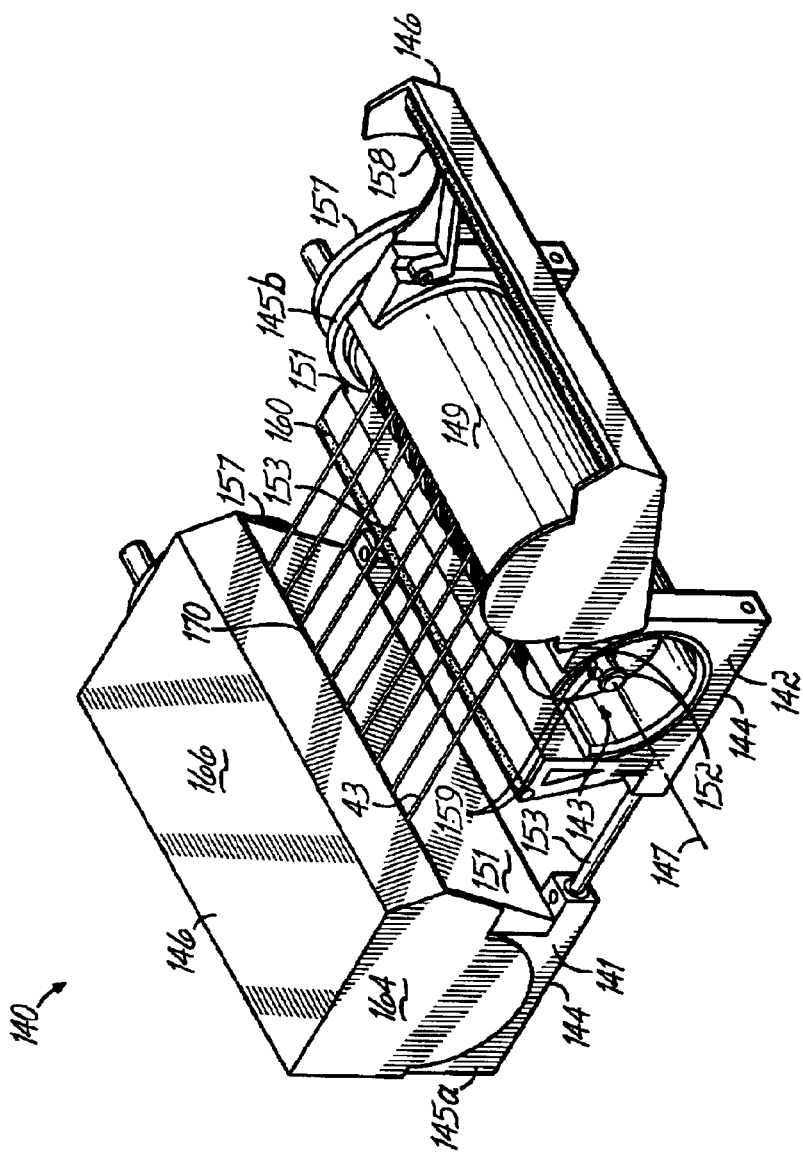
FIG. 6 is another perspective view of the holder of FIG. 5, shown with the lid of one of the outer housings closed.

With reference to FIGS. 5, 5A and 6 and in another embodiment of the holder of the present invention, a holder 140 includes a pair of outer housings 141 and 142 and a plurality of spools 150 that are individually loaded with optical fibers 42. The holder 140 is adapted to hold a plurality of optical fibers 42 for plasma treatment in a plasma treatment space, such as vacuum processing space 16 (FIG. 1), and differs in this regard with holder 40 (FIGS. 1 and 2), which is adapted to hold a single optical fiber 42.

With continued reference to FIGS. 5, 5A and 6, each of the outer housings 141 and 142 includes a base 144 having a longitudinally-extending, right-cylindrical cavity 143, a hinged lid 146 having parallel, spaced-apart arms pivotably attached to the base 144, and a winding shaft 148 extending along a longitudinal axis 147 through the cavity 143. Base 144 includes a pair of longitudinally-spaced side supports 145a and 145b, a generally cylindrical side wall 149 supported by a crescent-shaped, upwardly-facing surface on each of side supports 145a and 145b, and a flange 151 supported by a flat, upwardly-facing surface on each of side supports 145a and 145b. Each side support 145a and 145b has a flat, downwardly-facing bottom surface for contacting a flat surface (not shown) with a stable engagement. The side wall 149 defines the boundary of cavity 143 with the exception of one open end 161 (FIG. 5A) through which the spools 150 are received and an elongate slot 162 aligned with longitudinal axis 147.

The lid 146 includes a side panel 164 sized to close or fill the open end 161 of the side wall 149 and a longitudinally-extending panel 166 sized to close or fill slot 162. The lid 146 may be cantilevered between an open position that affords access through open end 161 and slot 162 to the cavity 143 and a closed position in which the ends of the optical fibers 42 are substantially confined within the cavity 143 of one of the bases 144. A pair of guide rods 153 interconnects outer housing 141 with outer housing 142 to maintain an alignment therebetween, to permit the separation or spacing between the outer housings 141 and 142 to be accurately and precisely determined, and to facilitate installation of holder 140 into a plasma treatment chamber after the optical fibers 42 are loaded.

Removably attached by a conventional fastener, such as a snap ring, to one end of each winding shaft 148 is a handle 157. Each handle 157 is used to rotate a corresponding one of the winding shafts 148 for winding the opposite ends of each of the optical fibers 42 about a pair of spools 150, as described below. Disposed on each winding shaft 148 is a pair of elastomeric rings 152, which are received in respective spaced-apart pairs of circumferential glands or grooves extending about the circumference of each winding shaft 148. Disposed between the pair of elastomeric rings 152 is a pair of longitudinally-spaced projections or keys 159 that project radially outwardly from the surface of the winding shaft 148.

With continued reference to FIGS. 5, 5A and 6, each of spools 150 includes a cylindrical winding portion 168 and a pair of spaced-apart circumferential side flanges 154 and 156 that project radially outward from opposite sides of the winding portion 168. The difference in the radius of the winding portion and side flanges 154, 156 is chosen to limit the space unoccupied by the wound end of the optical fiber 42. Typically, the difference in the radius is on the order of about 0.125 inches. It is appreciated that the construction of spools 150 is substantially similar to the construction of spool 44 (FIGS. 1 and 2). Extending longitudinally through the center of each spool 150 is a throughbore 172, which includes a keyway 155 that is also oriented parallel to the longitudinal axis 147.

The cavity 143 of each of the outer housings 141 and 142 is dimensioned and configured to receive multiple spools 150 so that holder 140 can secure multiple optical fibers 42 for plasma treatment. The cavity 143 of each base 144 has a curvature that is configured and dimensioned to receive the exterior of spools 150. More specifically, the cylindrical inwardly-facing surface of the side wall 149 has an inner radius, measured relative to longitudinal axis 147, dimensioned to receive an outer radius of side flanges 154 and 156.

When both of the lids 146 are in the open position, as illustrated in FIG. 5, the spools 150 may be loaded into holder 140. Specifically, the spools 150 are mountable in pairs in which one spool 150 is mounted on winding shaft 148 in the outer housing 141 and a second spool 150 is mounted on winding shaft 148 in the outer housing 142. To that end, the throughbore 172 of each spool 150 is diametrically sized to frictionally engage the outer surfaces of the elastomeric rings 152. The elastomeric rings 152 provide an additional frictional engagement with the throughbore 172 of spool 150 and also center spool 150 relative to the winding rod 148. The keyway 155 is adapted to engage a pair of longitudinally-spaced projections or keys 159 that project radially outwardly from the surface of the winding shaft 148. The mechanical interconnection of the keys 159 in keyway 155 provides each spool 150 with a positive driving engagement that limits rotation relative to winding shaft 148, when the winding shaft 148 is rotated with handle 157 to wind the respective end of one of the optical fibers 42 about the spool 150.

After the optical fiber 42 is attached to a pair of spools 150 and the spools 150 are repositioned longitudinally within cavity 143, the spools 150 do not contact the respective winding rods 148. This non-contacting relationship limits the amount of heat that can be transferred between each of the winding shafts 148 and the respective spools 150 and contributes to keeping the temperature of the optical fibers 42 low during plasma treatment. After longitudinal repositioning, the only engagement between the outer housings 141 and 142 and the spools 150 is the contact between the outer edges of flanges 154 and 156 and the inner surface of the side walls 149. Due to the limited contact area and the low thermal conductivity of spools 150, heat transfer is reduced and the optical fibers 42 are unlikely to be thermally damaged by heat generated during the plasma treatment.

With continued reference to FIGS. 5, 5A and 6, a first strip 158 of polymeric material is provided in a groove inset into the lid 146 and a second strip 160 of polymeric material is provided in a complementary groove in the flange 151 of base 144. When the lid 146 is in a closed position, as illustrated for outer housing 141 in FIG. 6, the optical fibers 42 are captured in an opening 170 between the strips 158 and 160. The engagement between the strips 158 and 160 provides a seal for the cavity 143 of each of the outer housings 141 and 142 such that the portions of the optical fibers 42 that are wound about the spools 150 are concealed or shielded from the plasma during plasma treatment. The interposition of the fibers 42 in the opening 170 between the strips 158 and 160 does not compromise the shielding provided by outer housings 141 and 142. It is understood by those of ordinary skill that the outer housings 141 and 142 of the holder 140 could be positioned in the ambient environment outside of a suitable sized plasma chamber, as illustrated in FIGS. 2A and 2B.

The base 144 and the lid 146 may be formed of aluminum or an aluminum alloy, the winding shaft 148 may be formed of a stainless steel, handle 157 may be formed of a polymer such as Delrin, and the spools 150 may be formed of a material having a relatively low thermal conductivity and a relatively low electrical conductivity, such as ceramics or fluoropolymers, and as described above. However, other structural materials are contemplated by the present invention.

In use and with reference to FIGS. 5, 5A and 6, a group of optical fibers 42 is secured by holder 140, which is either pre-positioned in a plasma processing chamber or positioned in the plasma processing chamber after the spools 150 are loaded into the outer housings 141 and 142. To that end, two spools 150 are positioned on respective ones of the winding shafts 148 with the keyway 155 of each spool 150 engaged with the keys 159 and the confronting cylindrical surface of throughbore 172 of each spool 150 contacting with elastomeric rings 152. The length of the mid-span portion can be changed by adjusting the transverse or lateral spacing between outer housings 141 and 142. One end of optical fiber 42 is secured to spool 150 mounted in outer housing 141 and the opposite end of the optical fiber 42 is secured to another spool 150 mounted in outer housing 142. The opposite ends of the optical fiber 42 are received in a hole (not shown) provided in one of the flanges 154 and 156 of each spool 150 or attached by a conventional fastener such as a clip, which provides the initial securement of the optical fiber 42 to each spool 150 prior to winding. The winding shaft 148 of outer housing 141 is rotated with the associated handle 157 in a direction for winding the first end of the optical fiber 42 about the first of the spools 150. Similarly, the winding shaft 148 of outer housing 142 is rotated with the associated handle 157 in a direction for winding a second end of the optical fiber 42 about the other of the pair of spools 150. After winding is completed, the mid-span portion 43 of optical fiber 42 extends between the first pair of spools 150.

The first pair of spools 150 is then released from engagement with elastomeric rings 152 and the keys 159 by manual application of a longitudinally-directed force. The first pair of spools 150 are slidingly moved by that force longitudinally toward the opposite end of the cavities 143 of the respective outer housings 141 and 142. The spools 150 are supported by the radially facing interior surface surrounding the cavity 143 and have a substantially non-contacting relationship with the winding shaft 148 when carrying an optical fiber 42 and loaded into the holder 140 for plasma treatment.

A second pair of spools 150 is positioned on the respective winding shafts 148 of outer housings 141 and 142 and engaged with respective ones of the elastomeric rings 152 and keys 159. Ends of a second one of the optical fibers 42 are wound about the second pair of spools 150, in the manner described above, so that the mid-span portion of the second optical fiber 42 extends therebetween. The second pair of spools 150 is slidingly moved along the winding shaft 148 of the respective outer housing 141 and 142 toward the opposite end of the cavity 143 until the first pair of spools 150 is contacted. A plurality of pairs of spools 150 is attached to each of the winding shafts 148 in a manner similar to the first two pairs of spools 150 until the outer housings 141 and 142 are filled with less than or equal to a full capacity of spools 150. Thereafter, each handle 157 is removed from its winding shaft 148 and each lid 146 is cantilevered to the closed position for engaging the base 144 of each of the corresponding outer housings 141 and 142.

When each lid 146 in the closed position, as illustrated for outer housing 141 in FIG. 6, an outer surface of flange 151 is inclined inwardly toward the second strip 160 of polymeric material and the adjacent outer surface of the lid 146 is inclined inwardly toward the first strip 158 of polymeric material. The optical fibers 42 are captured in a narrow transverse opening 170 between the first polymeric strip 158 and the second polymeric strip 160. The inward convergence of the outer surfaces of the flange 151 and the lid 146 contributes to preventing plasma penetration from the plasma treatment space through the opening 170 into the interior of either of the outer housings 141, 142.

If not already positioned within the plasma processing system, the holder 140 is then placed in the plasma treatment space of a plasma processing system, such as plasma processing system 10 (FIGS. 1 and 2). The buffer and, optionally, the cladding may then be removed from the mid-span portion 43 of each optical fiber 42 by treating, in the plasma processing system, with any plasma having suitable characteristics. In particular, the buffer and, optionally, the cladding may be removed by plasma treatment under the plasma conditions described herein.

The present invention further contemplates a method of removing the buffer and, optionally, the cladding from an optical fiber. According to the present invention and with reference to FIGS. 3A and 3B, at least the buffer 70 is removed from a mid-span portion 71 of the optical fiber 72 by mounting optical fiber 72 to a pair of holders 80, such as holder 40 (FIGS. 1 and 2) or holder 140 (described below in FIGS. 5 and 6), placing the holders 80 into a plasma processing chamber, such as the vacuum chamber 12 (FIG. 1) or vacuum chamber 112 (FIG. 2A), generating a plasma from a process gas in the processing chamber, and exposing the buffer 70 to the plasma for a duration sufficient to remove the buffer 70 from at least the mid-span portion 71. A plasma formed from a suitable process gas or gas mixture will be chemically reactive with the carbon-based material forming the buffer 70.

A mixture of process gases suitable for use in the buffer removal process consists of carbon tetrafluoride ($CF_4$) and oxygen ($O_2$) in the range of 30% $CF_4$: 70% $O_2$ by flow rate to 10% $CF_4$: 90% $O_2$ by flow rate and, typically, a gas mixture of about 20% $CF_4$: 80% $O_2$ by flow rate. Process gas is supplied to the processing chamber at a flow rate between about 200 sccm to about 800 sccm, typically about 500 sccm. The flow rate and pumping rate are adjusted to establish an operating pressure in the processing chamber between about 250 mTorr and about 500 mTorr, typically about 400 mTorr. A plasma is generated from the gas mixture in processing chamber by applying an RF power of between about 300 watts and about 1000 watts. A typical plasma treatment time sufficient to remove the buffer 70 ranges from about 5 minutes to about 10 minutes but will depend, among other parameters, upon the radial thickness of the buffer 70 and the specific polymer comprising the buffer 70.

With specific reference to FIG. 3, ions and radicals 73 from the plasma interact with the carbon-based material of the buffer 70, that covers a cladding 76 surrounding the mid-span portion 43 of the optical fiber 42. Atomic and molecular fluorine and oxygen radicals and ions 73 including generated by the plasma diffuse from the bulk of the plasma to the outer exposed surface of the buffer 70. The chemically-active fluorine, oxygen and oxyfluoro-radicals and ions 73 react with the carbon-based material constituting the buffer and produce volatile byproduct gases 74 such as carbon dioxide ($CO_2$), carbon monoxide (CO), and hydrogen fluoride (HF). Volatile byproduct gases 74 are released from the surface of the buffer 70 as the radial thickness of the buffer 70 is incrementally eroded away with increasing plasma exposure. The volatile gaseous byproducts 74 are evacuated from the processing chamber along with spent and excess process gas. For given plasma conditions, the length of the treatment time controls the radial thickness of the buffer 70 that is removed. Typically, the entire buffer 70 is removed from optical fiber 72, but the present invention is not so limited.

With reference to FIG. 3A, the buffer 70 is stripped from the mid-span portion 71 of the optical fiber 72 following plasma treatment. The thickness of the buffer 70 is tapered in transition zones 78 (FIG. 3A) that are proximate to either extremum of the stripped mid-span portion 71. Each transition zone 78 tapers frustoconically in diameter, from narrow to wide, in a direction from the mid-span portion 71 to portions of buffer 70 that were shielded within housings 80 during the plasma treatment. Typically, portions of buffer 70 that were not plasma treated retain the full buffer thickness, the buffer 70 is completely and uniformly removed from the mid-span portion 71, and the transition zones 78 are provided at the junctions therebetween.

Although the invention is not limited by any theory regarding the mechanism of action of the tapering, two mechanisms are believed to be singularly or collectively responsible. A first possible mechanism is relate to modification of the etching isotropy due to the proximity of the metallic outer housing of holder 80, such as outer housings 46, 141 and 142. A second possible mechanism is the accumulation of a static electrical charge on the metallic outer housing of holder 80, which is induced by interaction of each outer housing of holder 80 with the sheath of the plasma. The accumulated charge on the outer housing of holder 80 provides a repulsive Coulomb force that locally reduces the supply of radicals and operates so that the thickness of the buffer 70 is tapered in the transition zones 78. Specifically, the accumulated charge repulses the oppositely-charged fluorine, oxygen and oxyfluoro-ions and radicals so that the etch rate is reduced for portions of the mid-span portion 71 of the optical fiber 72 near the surface of the outer housing of each holder 80.

The appropriate treatment time needed to completely remove the buffer 70 from the mid-span portion 71 of the optical fiber 72 is ascertained, for example, by empirical measurements of the removed thickness as a function of exposure time to the plasma. Process parameters, such as the treatment time, the RF power and the process gas mixture and pressure, must be precisely controlled to ensure that the buffer 70 is completely removed without eroding a significant thickness of the cladding 76, unless cladding 76 is to be partially or totally removed as well. The process parameters are selected according to the specifications of the optical fiber 72, such as the thickness of the buffer 70 and the polymer forming the buffer 70. After a statistically-significant determination is made of process parameters sufficient to remove the buffer 70, the process parameters including treatment time are assumed to be reproducible. Intermittent quality control checks may be made to verify the reproducibility. The treatment time or end point for the buffer removal process may be determined empirically from fiber pull strengths or may be determined by optical microscopy or scanning electron microscopy of the plasma treated optical fibers 72.

Figure 4:
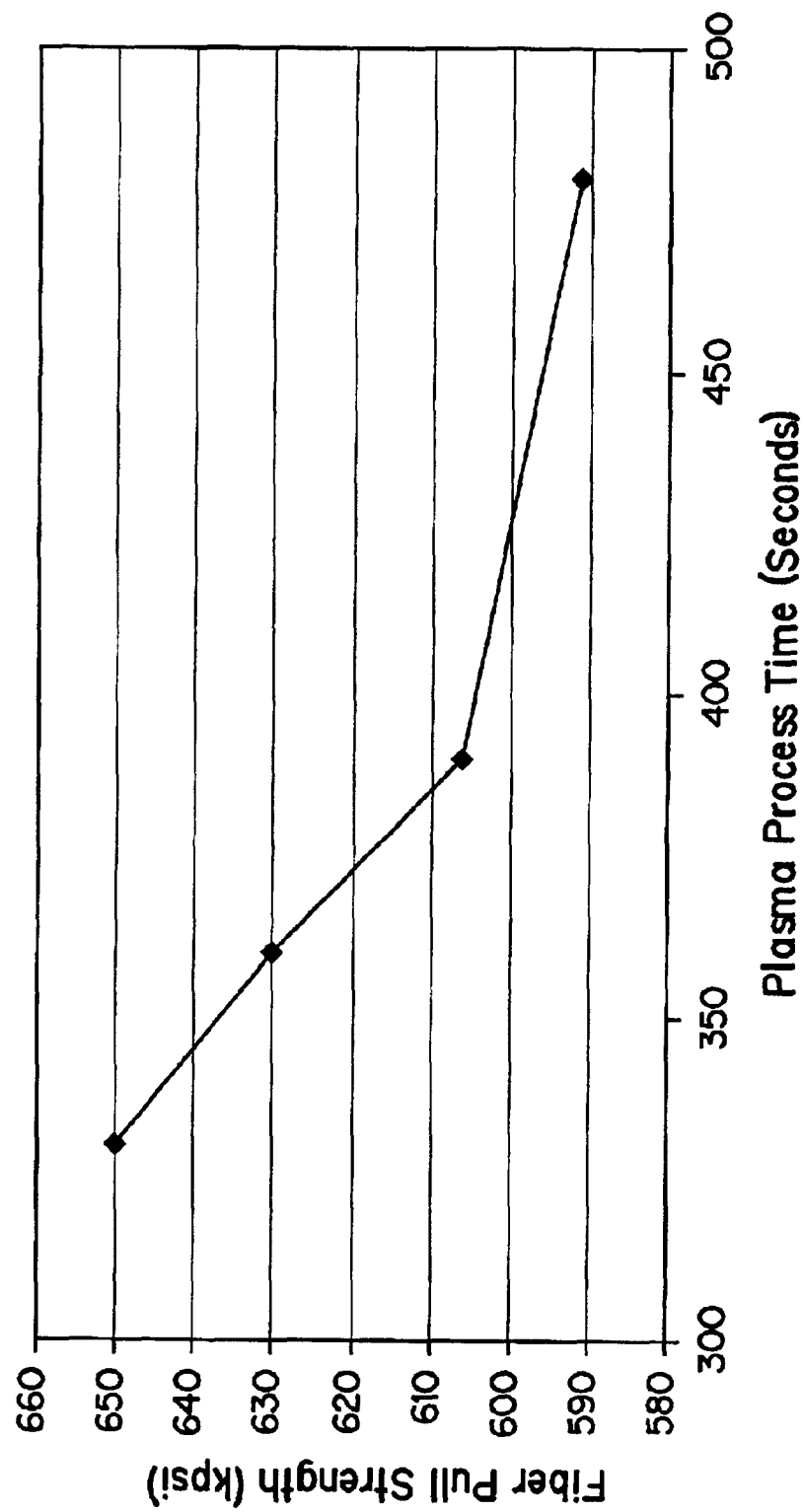
FIG. 4 is a graphical representation of the fiber pull strength as a function of the plasma treatment time for a plasma process according to the present invention.

With reference to FIG. 4, a graphical representation of the fiber pull strength as a function of plasma treatment time is presented for the plasma processing of an optical fiber having an intrinsic strength of 700 kpsi, a 125 $\mu$m diameter cladding, and a 250 $\mu$m total diameter including the buffer. For treatment times less than about 5½ minutes (330 seconds), the buffer on the optical fiber is not completely removed. The buffer is completely removed for a treatment time of about 6 minutes, which represents a volumetric removal rate of about 0.067 cubic millimeters per minute ($mm^3$/min). As the treatment time is increased, the glass of the cladding is etched by the plasma with a concomitant reduction in the fiber pull strength. The slight reduction in fiber pull strength from the intrinsic strength may be caused by slight over-etching or by experimental uncertainty in the pull tests.

Referring again to FIG. 3A, it is understood that, after the buffer 70 is removed, the plasma treatment may be continued using the same processing conditions to partially or completely remove the cladding 76 from a core 82 of the optical fiber 72. Under the same plasma conditions as described above, the etch rate for the cladding 76, typically a silica glass, is much smaller than the etch rate from the buffer 70 so that a relatively longer treatment time is required, as compared with removal of buffer 70. The time required to remove all or a portion of the cladding 76 may be determined empirically from groups of tests on optical fibers 72 having similar constructions, including layer compositions and thicknesses. Optical fibers 72 tend to conform to industry standards for the diameters of the core, cladding and buffer so that such empirical determinations are readily made. Plasma treatments using the empirical determinations are reproducible among batches of optical fibers 72.

After the etching process is completed, residual fluorine-containing gas phase byproducts, such as hydrogen fluoride, remain absorbed and/or adsorbed to the outer surface of the core 82 of optical fiber 72. If the optical fiber 72 were removed from the vacuum environment of the processing chamber immediately following the plasma treatment, the residual fluorine-containing species may readily react with moisture or water vapor in the air to form hydrofluoric acid. Hydrofluoric acid is a highly corrosive acid that attacks silicates, such as the silicate glass commonly forming the core and cladding of the optical fiber 72, and that can produce significant pitting of the glass surface. If the optical fiber 72 is maintained in a controlled atmosphere, such as a dry inert gas atmosphere, hydrofluoric acid cannot form. However, if the portion of cladding 76 having the buffer 70 removed is to be exposed to a moisture-laden atmosphere, it is desirable to remove the residual fluorine-containing species from the surface of the optical fiber 72 before removing the optical fiber 72 from the processing chamber.

To that end, the present invention provides a plasma passivation process that removes the residual fluorine-containing gas phase byproducts from the outer glass surface of the cladding 76 in mid-span portion 71 after at least the buffer 70 is removed (or, optionally, the outer glass surface of the core 82 after the cladding 76 is removed) and while the optical fiber 72 is positioned within the processing chamber after the stripping plasma treatment. The passivation process consists of generating a plasma in the processing chamber from a process gas comprising hydrogen ($H_2$). The hydrogen reacts with the residual fluorine-containing gas phase byproducts to form hydrogen fluoride (HF), which is volatile and is removed by pumping of the processing chamber along with the spent and excess process gas. Alternatively, the hydrogen gas can be mixed with argon (Ar) in a mixture having a composition of 50% $H_2$: 50% Ar by flow rate, wherein the more-massive Ar ions promote sputtering of the residual fluorine-containing gas phase byproducts from the surface of the core 82 or cladding 76, as may be the case, and thereby improve the efficiency of the passivation process.

Process gas comprising a mixture of argon and hydrogen is typically supplied to the processing chamber at a rate of about 50 sccm of Ar and 50 sccm of $H_2$ to provide an operating pressure between about 100 mTorr and about 300 mTorr, typically about 200 mTorr. In other embodiments, process gas consisting of only hydrogen may supplied to the processing chamber at a rate of about 50 sccm of $H_2$ to provide an operating pressure between about 100 mTorr and about 800 mTorr, typically about 200 mTorr. The flow rate of process gas and the pumping rate is adjusted to sustain the operating pressure at a roughly constant level. A plasma is generated from the process gas by applying an RF power of between about 100 watts and about 800 watts, typically about 300 watts. A typical treatment time for exposing the mid-span portion 71 of the optical fiber 72 to the plasma is about 2 minutes to about 5 minutes, typically about 5 minutes. The end result of the passivation process is a hydrated surface on the glass surface of the cladding 76 or core 82, rather a fluorinated surface that exists before the passivation process is performed.

It is appreciated that the plasma stripping methods and surface passivation methods of the present invention may be used in combination with the holders 40 and 140 of the present invention for stripping the buffer and, optionally, the cladding from mid-span portions of optical fibers. However, the invention is not so limited and the method be practiced independently of the holders 40 and 140. Similarly, the holders 40 and 140 of the present invention may be utilized for treating the mid-span portions of optical fibers under other diverse plasma conditions.

While the above description and accompanying drawings set forth various embodiments of the invention, it will be apparent to those skilled in the art that additions and modifications may be made without departing from the principles of the invention. Accordingly, what is claimed is:

1. An apparatus for use in treating an optical fiber with a plasma in a processing chamber, the optical fiber having a first end, a second end, and a mid-span portion between the first and second ends, comprising:

a first outer housing;

a second outer housing spaced apart from said first outer housing;

a first holder positioned within said first outer housing, said first holder capable of receiving the first end of the optical fiber; and a second holder positioned within said second outer housing, said second holder capable of receiving the second end of the optical fiber, wherein said first outer housing is movable relative to said second outer housing to define a length of the mid-span portion of the optical fiber that is exposed to the plasma in the processing chamber.

2. The apparatus of claim 1 wherein said first outer housing is positioned within the processing chamber.

3. The apparatus of claim 2 wherein said second outer housing is positioned within the processing chamber.

4. The apparatus of claim 2 wherein said first outer housing and said second outer housing are capable of shielding said first and said second holders from the plasma in the processing chamber so that the first and the second ends of the optical fiber are not significantly exposed to the plasma.

5. The apparatus of claim 1 further comprising:

a plurality of first holders positioned within said first outer housing, each of said first holders capable of receiving a first end of a different optical fiber; and a plurality of second holders positioned within said second outer housing, each of said second holders capable of receiving a second end of the different optical fiber, a mid-span portion of the different optical fiber extending between said first outer housing and said second outer housing so that the mid-span portion is exposed to the plasma in the processing chamber.

6. The apparatus of claim 1 wherein said first outer housing and said second outer housing are formed of a first material having a first dielectric constant and said first holder and said second holder are formed of a second material having a dielectric constant smaller than said first dielectric constant.

7. The apparatus of claim 6 wherein said first material is selected from the group consisting of metals and metal alloys and said second material is selected from the group consisting of ceramics and polymers.

8. The apparatus of claim 1 wherein said first outer housing has a first longitudinal axis and a first winding shaft extending along said longitudinal axis, and said first holder includes a first throughbore dimensioned and configured to be positioned on said first winding shaft.

9. The apparatus of claim 8 wherein said first winding shaft is rotatable about said longitudinal axis and includes a first engagement structure, said first holder includes a second engagement structure that is capable of releasably interconnecting with said first engagement structure, and said first winding shaft includes a first removable handle that is capable of rotating said first winding shaft for winding the first end of the optical fiber about said first holder.

10. The apparatus of claim 9 wherein said first engagement structure is a key located on an outer surface of the first winding shaft and said second engagement structure is a keyway located on an interior surface of the first throughbore.

11. The apparatus of claim 9 wherein said first winding shaft includes a circumferential gland and an elastomeric ring located in said gland, said elastomeric ring contacting said first throughbore for centering said first holder relative to said first winding shaft.

12. The apparatus of claim 8 wherein said second outer housing has a second longitudinal axis and a second winding shaft extending along said second longitudinal axis, and said second holder includes a second throughbore dimensioned and configured to be positioned on said second winding shaft.

13. The apparatus of claim 12 wherein said second winding shaft is rotatable about said second longitudinal axis and includes a third engagement structure, said second holder includes a fourth engagement structure that is capable of releasably interconnecting with said third engagement structure, and said second winding shaft includes a second removable handle that is capable of rotating said second winding shaft for winding the second end of the optical fiber about said second holder.

14. The apparatus of claim 13 wherein said third engagement structure is a second key located on an outer surface of said second winding shaft and said fourth engagement structure is a keyway located on an interior surface of said second throughbore.

15. The apparatus of claim 13 wherein said second winding shaft includes a circumferential gland and an elastomeric ring located in said gland, said elastomeric ring contacting said second throughbore for centering said second holder relative to said second winding shaft.

16. The apparatus of claim 1 wherein said first outer housing includes a base portion having a first interior space adapted to receive said first holder and a lid that is movable between an open position in which said first holder may be placed within said first interior space and a closed position in which said first holder is substantially enclosed within said first interior space and substantially shielded from the plasma during plasma treatment.

17. The apparatus of claim 16 wherein said second outer housing includes a base portion having a second interior space adapted to receive said second holder and a lid that is movable between an open position in which said second holder may be placed within said second interior space and a closed position in which the second holder is substantially enclosed within said second interior space and substantially shielded from the plasma during plasma treatment.

18. The apparatus of claim 17 wherein said first outer housing includes an first opening communicating with said first interior space through which the first end of the optical fiber passes and said second outer housing includes a second opening communicating with said second interior space through which the second end of the optical fiber passes.

19. A plasma processing system for treating an optical fiber with a plasma, the optical fiber having a first end, a second end and a mid-span portion between the first and second ends, comprising:
a processing chamber having a plasma treatment space;
a plasma source coupled with said processing chamber for providing a plasma within said plasma treatment space, said plasma source including a pair of electrodes, and said plasma treatment space being defined between said pair of electrodes;
a first outer housing;
a second outer housing spaced apart from said first outer housing, said first outer housing and second outer housing being positioned within said plasma treatment space on one of said pair of electrodes;
a first holder positioned within said first outer housing, said first holder capable of receiving the first end of the optical fiber; and
a second holder positioned within said second outer housing, said second holder capable of receiving the second end of the optical fiber, and the mid-span portion of the optical fiber extending between said first outer housing and said second outer housing so that the mid-span portion is positioned within said plasma treatment space for exposure to the plasma.

20. The plasma processing system of claim 19 wherein said plasma source includes:
a power supply electrically connected with said pair of electrodes, at least one of said pair of electrodes being powered.

21. The plasma processing system of claim 20 wherein said first outer housing and said second outer housing are positioned on said powered electrode.

22. The plasma processing system of claim 19 wherein said first outer housing is positioned within the processing chamber.

23. The plasma processing system of claim 22 wherein said second outer housing is positioned within the processing chamber.

24. The plasma processing system of claim 22 wherein said one of said first outer housing and said second outer housing is capable of shielding the respective one of said first and said second holders from the plasma in said processing chamber so that the first and the second ends of the optical fiber are not significantly exposed to the plasma.

25. The plasma processing system of claim 19 wherein said first outer housing is movable relative to said second outer housing to define a length of the mid-span portion of the optical fiber that is exposed to the plasma in said plasma treatment space.

26. The plasma processing system of claim 19 further comprising:
a plurality of first holders positioned within said first outer housing, each of said first holders capable of receiving a first end of a different optical fiber; and
a plurality of second holders positioned within said second outer housing, each of said second holders capable of receiving a second end of the different optical fiber, a mid-span portion of the different optical fiber extending between said first outer housing and said second outer housing so that the mid-span portion is exposed to the plasma in said processing chamber.

27. The plasma processing system of claim 19 wherein said first outer housing and said second outer housing are formed of a first material having a first dielectric constant and said first holder and said second holder are formed of a second material having a dielectric constant smaller than said first dielectric constant.

28. The plasma processing system of claim 27 wherein said first material is selected from the group consisting of metals and metal alloys and said second material is selected from the group consisting of ceramics and polymers.

29. The plasma processing system of claim 19 wherein said first outer housing has a first longitudinal axis and a first winding shaft extending along said first longitudinal axis, and said first holder includes a first throughbore dimensioned and configured to be positioned on said first winding shaft.

30. The plasma processing system of claim 29 wherein said first winding shaft is rotatable about said longitudinal axis and includes a first engagement structure, said first holder includes a second engagement structure that is capable of releasably interconnecting with said first engagement structure, and said first winding shaft includes a first removable handle that is capable of rotating said first winding shaft for winding the first end of the optical fiber about said first holder.

31. The plasma processing system of claim 30 wherein said first engagement structure is a key located on an outer surface of the first winding shaft and said second engagement structure is a keyway located on an interior surface of the first throughbore.

32. The plasma processing system of claim 30 wherein said first winding shaft includes a circumferential gland and an elastomeric ring located in said gland, said elastomeric ring contacting said first throughbore for centering said first holder relative to said first winding shaft.

33. The plasma processing system of claim 29 wherein said second outer housing has a second longitudinal axis and a second winding shaft extending along said second longitudinal axis, and said second holder includes a second throughbore dimensioned and configured to be positioned on said second winding shaft.

34. The plasma processing system of claim 33 wherein said second winding shaft is rotatable about said second longitudinal axis and includes a third engagement structure, said second holder includes a fourth engagement structure that is capable of releasably interconnecting with said third engagement structure, and said second winding shaft includes a second removable handle that is capable of rotating said second winding shaft for winding the second end of the optical fiber about said second holder.

35. The plasma processing system of claim 34 wherein said third engagement structure is a second key located on an outer surface of said second winding shaft and said fourth engagement structure is a keyway located on an interior surface of said second throughbore.

36. The plasma processing system of claim 34 wherein said second winding shaft includes a circumferential gland and an elastomeric ring located in said gland, said elastomeric ring contacting said second throughbore for centering said second holder relative to said second winding shaft.

37. The plasma processing system of claim 19 wherein said first outer housing includes a base portion having an interior space adapted to receive said first holder and a lid that is movable between an open position in which said first holder may be placed within said interior space and a closed position in which said first holder in substantially enclosed within said interior space and substantially shielded from the plasma during plasma treatment.

38. The plasma processing system of claim 37 wherein said first outer housing includes an first opening through which the first end of the optical fiber passes and said second outer housing includes a second opening through which the second end of the optical fiber passes.

39. An apparatus for use in treating an optical fiber with a plasma in a processing chamber, the optical fiber having a first end, a second end, and a mid-span portion between the first and second ends, comprising:
   a first outer housing;
   a second outer housing spaced apart from said first outer housing;
   a first holder positioned within said first outer housing, said first holder capable of receiving the first end of the optical fiber; and
   a second holder positioned within said second outer housing, said second holder capable of receiving the second end of the optical fiber, wherein said first outer housing is positioned relative to said second outer housing so that a select length of the mid-span portion of the optical fiber is within the processing chamber for exposure to the plasma.

* * * * *